3,313,600
METHOD FOR PREVENTING CLOGGING
OF FIBROUS FILTERS
William Cundall Laughlin, Modesto, Calif., assignor to FMC Corporation, New York, N.Y., a corporation of Delaware
No Drawing. Filed Jan. 17, 1964, Ser. No. 338,314
4 Claims. (Cl. 23—312)

This invention relates to a method for preventing the clogging of fibrous filters used to separate precipitates from aqueous solutions thereof, and more particularly, to preventing the clogging of fibrous filters by in situ precipitated insolubles such as barium sulfate during the filtration of an aqueous extract of barium sulfide (black ash).

In the conventional process of producing barium sulfide (BaS), a barite ore which normally contains at least about 90% barium sulfate is heat-treated with coke in a kiln in order to form barium sulfide. The reaction takes place according to the following equation:

$$BaSO_4 + 4C \rightarrow BaS + 4CO$$

The kiln product, which is termed "crude black ash," contains substantial quantities of impurities, including barium sulfate, barium carbonate, barium silicate, coke, and metallic oxides such as iron oxide and aluminum oxide.

The barium sulfide is separated from residual impurities by finely grinding the crude black ash in a ball mill or hammer mill until it is about −200 mesh and then leaching the water-soluble barium sulfide from the insoluble gangue. The leaching is carried out by mixing the finely ground crude black ash with water and passing the resulting aqueous mixture through clarifiers to separate the barium sulfide containing filtrate from the remaining insolubles. These gravity clarifiers most conventionally are supplemented with hydrocyclones which separate the mixture into two streams, one containing the bulk of the barium sulfide solution, and a second stream containing a mixture of insolubles and barium sulfide solution. A further separation of the second stream to recover the barium sulfide values from the insolubles is carried out by passing this mixture through a fibrous filter and water washing the insoluble residue in order to recover the final traces of water-soluble barium sulfide. This latter filtration and washing is necessary if an efficient operation is to be carried out without the loss of excessive amounts of barium sulfide.

A serious problem has arisen in carrying out this last filtration. This is due to the rapid rate at which the fibrous filter becomes clogged or blinded during filtration of the above mixture. This has necessitated frequent shut-downs to free the cloth of solid particles permanently lodged in the interstices of the filtration media. It is believed that the rapid blinding of the fibrous filter media is primarily due to the reaction of barium ions in the mixture with other anions, e.g. sulfate or carbonate, that are present in the water used for washing the mixture; this reaction produces insolubles that precipitate in situ either on or within the fiber bundles of the filter media.

Various remedies have been suggested for obviating this undesirable clogging of the filter. Among these are the use of frequent acid washes to keep the filter cloth open and the installation of high impact reciprocating wash nozzles to blast the filter cloth free of blinding particles. These remedies are successful in clearing the filter media but they do not aid in preventing the rapid clogging of the filters while they are in operation. Further, these remedies often require shut-down of the filter unit and are therefore not helpful in promoting continuous operation.

It is an object of the present invention to prevent the rapid clogging of filter media by in situ produced precipitates, by a simple and inexpensive means, preferably by means which can be carried out while the filter unit is in operation.

This and other objects will be apparent from the following disclosure.

I have now found that the rapid clogging of fibrous filters by the precipitation of insolubles in situ on the filters can be prevented by maintaining a liquid hydrophobic, oil film on the fibers of the filter. The oil film may be of mineral or vegetable origin and is applied continuously or periodically in amounts sufficient to maintain an adherent oil film on the filter cloth, but not to fill the interstices of the filter.

It is most unexpected to find that this simple expedient will prevent such tenacious adhesion of the particles to the fibrous filter with consequential clogging of the interstices.

While it is not known why the liquid, hydrophobic film of oil is effective in preventing in situ precipitated particles from clogging the fibrous filter, it is believed that the oil film prevents the particles from attaching themselves to the fiber of the filter cloth in two ways. First, the oil forms a thin hydrophobic film around each fibrous bundle that makes up the threads of the filter and retards the flow of water through the fibrous bundle. This reduces the introduction of anions into the fibrous bundle from the flow of water, which can precipitate with barium within the fiber bundle per se. A second effect of the oil film is to interpose a liquid non-adhersing surface between the fibrous bundle and any in situ precipitated particles to reduce any adherence of the solid particles to the fibrous filaments. It has been noted that, in the absence of such liquid, hydrophobic oil films, the precipitated particles adhere tenaciously to the individual fibrous bundles of the filter and form a barrier to the free flow of barium sulfide solution through the interstices of the fibrous filter.

In the process of carrying out the present invention, the light oil film is applied to the fibrous filter media by atomizing the oil in an air stream and blowing it onto the filter. In this way, a uniform, thin film of oil can be applied. The oil is applied in amounts sufficient to maintain the film on the cloth fibers. The oil film need not be very thick; a film of only a few hundred thousandths of an inch in thickness will prevent the clogging of the filter. For example, about 0.1 ml. of oil is sufficient to cover a square foot of filter cloth. The oil dispersing air stream is applied to the cloth at a rate of at least about 2.75 s.c.f.m./lineal foot of the cloth perpendicular to the line of travel in order to adequately atomize the oil and apply it uniformly over the entire filter fabric. Excess oil is not deleterious to preventing clogging, but the excess oil is removed in the filtrate or filter cake and too much may become objectionable.

The fibrous filter may be made up of either synthetic or natural fibers, e.g. polypropylene, "Teflon," "nylon," and cotton, and may be used in any type of gravity filter, or in a frame, leaf, disc or cylinder type pressure or vacuum filter.

The oil which is applied to the fibrous filter may be of mineral derivation or of vegetable derivation or of animal derivation. It should be non-volatile, non-drying, and non-oxidizable under the conditions of use. It should have a viscosity which will permit it to be readily atomized in the air stream used to apply the oil to the fibrous filter but of sufficient viscosity so as to form an adherent thin hydrophobic film on the fibrous filter and not be readily washed away by the aqueous solution. An oil having a Saybolt Universal viscosity in the range of from about 35 to about 1000 has been found suitable.

Typical vegetable and animal oils that have been found suitable are almond, black mustard, cod liver, croton, grape seed, hazelnut, peach kernel, and white mustard seed oil.

The invention can be applied to gravity, pressure and vacuum filters. The filters can be treated continuously or intermittently with oil as required to maintain the oil film on the fibrous filter. Continuous application can be made where the cake is completely removed from the filter cloth through each filter cycle while periodic oil applications are preferred when the filter cake is not completely removed from the filter media during each cycle.

While the present invention has been described with respect to its application to barium sulfide, the invention can be applied to the filtration of other salts whose cations form insoluble precipitates with one or more anions in solution. For example, various soluble calcium, magnesium, iron, copper, lead, mercury, strontium, zinc and silver salts can be filtered using the process of the present invention in order to avoid clogging of the filters used in the recovery of these products. The present process has application wherever a precipitate is formed in situ during a filtration operation. The precipitation need not be due to the formation of insoluble impurities in the system, as is the case in the recovery of barium sulfide. It can also be due to changes in pH, temperature and/or pressure variations which cause in situ formation of insolubles within the solution to be filtered. In all these applications, the rapid clogging of the fibrous filters by the precipitation of the insolubles in situ is reduced or eliminated by maintaining a liquid hydrophobic oil film on the fibers of the filter.

The following examples are given to illustrate the present invention and are not deemed to be limitative thereof.

*Example 1*

Run A.—A 48-inch wide polypropylene filter cloth on a continuous drum-type filter was used to separate an aqueous barium sulfide liquor from insoluble residues. The polypropylene filter cloth had a length of 25 feet and was passed through the solution at a rate of 3 to 5 feet per minute. The solution being filtered contained the following:

| Ingredients: | Percent (by wt.) |
|---|---|
| BaS | 1–3 |
| $SiO_2$ | 4–6 |
| $BaSO_4$ | 1–3 |
| C | 2–4 |
| $R_2O_3$ | 0.3–0.6 |
| $BaSiO_3$ | 3–6 |

Insolubles were removed from the cloth by means of water sprays. The filter cloth was constantly sprayed by means of 12 spray nozzles equally spaced across the 48-inch wide cloth. Atomized oil was applied to the fibrous filter by metering 2.0 milliliters per minute of a mineral oil having a Saybolt Universal viscosity of 80 (Union Oil Company, Red Line 80), into a 15 s.c.f.m. air stream. This air stream was then passed to the 12 spray nozzles which uniformly distributed the atomized oil on the filter cloth. Twelve thousand pounds per hour of solution was able to be filtered through this unit without blinding or clogging of the filter cloth for 240 hours.

Run B.—The above process was duplicated except that no atomized oil film was applied to the filter. After the passage of 20 hours, the filter was found to be blinded and unable to filter the solution; the unit was taken out of operation and given an acid wash with 10% of HCl acid in order to remove the particles clogging the filter.

*Example 2*

Example 1, Run A, was repeated except that cod liver oil was substituted for the mineral oil. The results were substantially the same as with the mineral oil, with no blinding of the filter cloth after 200 hours of operation.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In a process of preventing the rapid clogging of fibrous filters by particles of water insoluble salts precipitated in situ on said fibrous filter, said salts having cations selected from the group consisting of barium, calcium, magnesium, iron, copper, lead, mercury, strontium, zinc and silver, the improvement which comprises maintaining an adherent, liquid, hydrophobic, oil film on the fibers of said filter thereby preventing in situ precipitated insolubles from rapidly clogging said fibrous filter.

2. Process of claim 1 in which the oil used in producing said oil film has a Saybolt Universal viscosity of from about 35 to about 1000.

3. Process of claim 1 in which the oil used in producing said oil film is a mineral oil.

4. In the process of recovering barium sulfide values from a crude black ash mixture containing barium sulfide and water insolubles and wherein said mixture is mixed with water and passed through a fibrous filter to remove said insolubles from an aqueous effluent containing barium sulfide, and wherein said fibrous filter is subjected to rapid clogging by insolubles precipitating in situ on said fibrous filter, the improvement which comprises maintaining an adherent, liquid, hydrophobic, oil film on the fibers of said filter thereby preventing in situ precipitated insolubles from rapidly clogging said fibrous filter.

No references cited.

REUBEN FRIEDMAN, *Primary Examiner.*

SAMIH ZAHARNA, *Assistant Examiner.*